United States Patent [19]
Garrison

[11] Patent Number: 4,583,481
[45] Date of Patent: Apr. 22, 1986

[54] METHOD AND APPARATUS FOR HITCHING A TRAILER TO A MOTOR VEHICLE

[76] Inventor: Roy Garrison, 201 Academy St., Canton, N.C. 28716

[21] Appl. No.: 660,736

[22] Filed: Oct. 15, 1984

[51] Int. Cl.⁴ .................................................. B60Q 11/00
[52] U.S. Cl. .................................... 116/28 R; 33/264; 280/477
[58] Field of Search ............ 116/28 R, 28 A; 340/51; 280/477; 33/264

[56] References Cited

U.S. PATENT DOCUMENTS

| | | | |
|---|---|---|---|
| 3,159,917 | 12/1964 | Whitehead | 116/28 R |
| 3,363,318 | 1/1968 | Folkins et al. | 116/28 R |
| 3,702,029 | 11/1972 | Anderson, Jr. | 116/28 R |
| 3,867,898 | 2/1975 | Lakamp | 116/28 R |
| 3,918,746 | 11/1975 | Lehtisaari | 280/477 |
| 3,966,231 | 6/1976 | Metzler | 280/477 |
| 4,012,056 | 3/1977 | Christensen | 280/477 |
| 4,065,147 | 12/1977 | Ross | 280/477 |
| 4,156,972 | 6/1979 | Vankrevelen | 33/264 |

FOREIGN PATENT DOCUMENTS

| | | | |
|---|---|---|---|
| 53431 | 8/1937 | Denmark | 116/53 |
| 2069430 | 8/1981 | United Kingdom | 280/477 |

OTHER PUBLICATIONS

"Trailer-Hitching Guide Puts You Right on Target", *Popular Science*, Jun. 1970, p. 95, Clifford G. Hansen.

Primary Examiner—Charles Frankfort
Assistant Examiner—W. Morris Worth
Attorney, Agent, or Firm—David M. Carter

[57] ABSTRACT

There is provided an improved method and apparatus for enabling one to easily hitch a trailer to a motor vehicle. The apparatus includes a rod mounted vertically a predetermined distance from the ball receiving cavity of the hitching tongue on a trailer. A second rod is mounted to the motor vehicle at or near a ball on its trailer hitch. A third rod having a guide at one end is mounted on either the first or the second rod, with the guide being the same distance from the rod upon which it is mounted as the first mentioned predetermined distance.

10 Claims, 2 Drawing Figures

METHOD AND APPARATUS FOR HITCHING A TRAILER TO A MOTOR VEHICLE

BACKGROUND OF THE INVENTION

This invention relates to trailer hitches. More particularly, it relates to a method and apparatus which enables one to easily hitch a trailer to a motor vehicle.

The use of recreational vehicles has become very popular in the United States and elsewhere. In particular, travel trailers and pop-up tents on trailers have become popular, primarily because it enables the user to utilize a pre-existing motor vehicle by merely hitching the trailer to the motor vehicle. However, because these trailers are quite often very heavy and cannot be easily moved to the back of one's motor vehicle to be hitched, it has become necessary for the user to move back the motor vehicle to the hitching tongue of the trailer to a very precise position near the ball on the motor vehicle's trailer hitch. This procedure is almost always a two-person job, because if the driver backs too far, he can damage the motor vehicle and/or the trailer. If the driver does not back far enough, he must go back into his vehicle and back up again.

Furthermore, during the actual hitching of the trailer, that is, actually placing the ball receiving cavity of the hitching tongue of the trailer onto the ball of the motor vehicle hitch, the driver must move the motor vehicle at least slightly while the other person manipulates the trailer tongue onto the ball. This procedure has caused many problems. One obvious problem is that an owner of a trailer simply cannot use it by himself unless it is already somewhat permanently hitched to his motor vehicle. There has been great frustration resulting from misjudging when the hitch ball does not align under the trailer tongue. Also, there have been safety problems because quite often the person outside of the motor vehicle stands behind the moving vehicle between the back end of the vehicle and the trailer, resulting in many accidents. Furthermore, there have been many cases of confrontations between family and friends because of the inability to communicate properly with the driver of the motor vehicle, and the person giving directions as to the alignment of the hitching ball and the trailer tongue. Also, trailers and motor vehicles have been damaged in the hitching process.

OBJECTS OF THE INVENTION

It is one object of this invention to provide an improved method and apparatus for enabling one to easily hitch a trailer to a motor vehicle.

It is another object to avoid the frustrations resulting from mis-judging when a hitch ball of a trailer hitch does not align under the trailer tongue.

It is another object to provide a means for safely hitching a trailer to a motor vehicle.

It is still another object to provide a means whereby the driver of a motor vehicle may by himself hitch a trailer to his motor vehicle.

It is yet another object to provide a apparatus for enabling one to easily hitch a trailer to a motor vehicle which is easy to install and enables one to hitch a trailer to the vehicle in a very short period of time.

SUMMARY OF THE INVENTION

In accordance with one form of this invention, there is provided an apparatus for enabling a trailer to easily be hitched to a motor vehicle. The apparatus includes a first, a second and a third rod. A mechanism is provided for mounting the first rod onto the hitching tongue of the trailer. Another mechanism is provided for mounting the second rod onto the motor vehicle near the ball of the trailer hitch. The third rod is mounted on either the first or the second rod, and the third rod projects away from the rod on which it is mounted. A guide is connected to the third rod, and is adapted to come into contact with the rod which does not have a third rod mounted thereto for insuring that the hitching tongue of the trailer is in the proper position near the ball of the trailer hitch for enabling one to easily hitch the trailer to the motor vehicle.

In accordance with another form of this invention, there is provided a method for hitching a trailer to a motor vehicle. A first rod is mounted on the hitching tongue of the trailer a predetermined distance from the ball receiving portion of the hitching tongue. A second rod is mounted on the motor vehicle near the ball of the trailer hitch. The predetermined distance is measured. A third rod having a guide connected to one of its ends is adjustably mounted to either the first or second rod so that the third rod projects away from the rod on which it is mounted at approximately a right angle. The third rod is adjusted so that the distance between the place on the third rod where it is mounted and the guide is approximately equal to the measured predetermined distance. The motor vehicle is moved towards the trailer until the rod not having the third rod attached thereto contacts or nearly comes into contact with the guide. The ball receiving portion of the hitching tongue is placed onto the ball, thus the trailer is hitched to the motor vehicle.

DESCRIPTION OF THE PREFERRED EMBODIMENT

Figure 1:
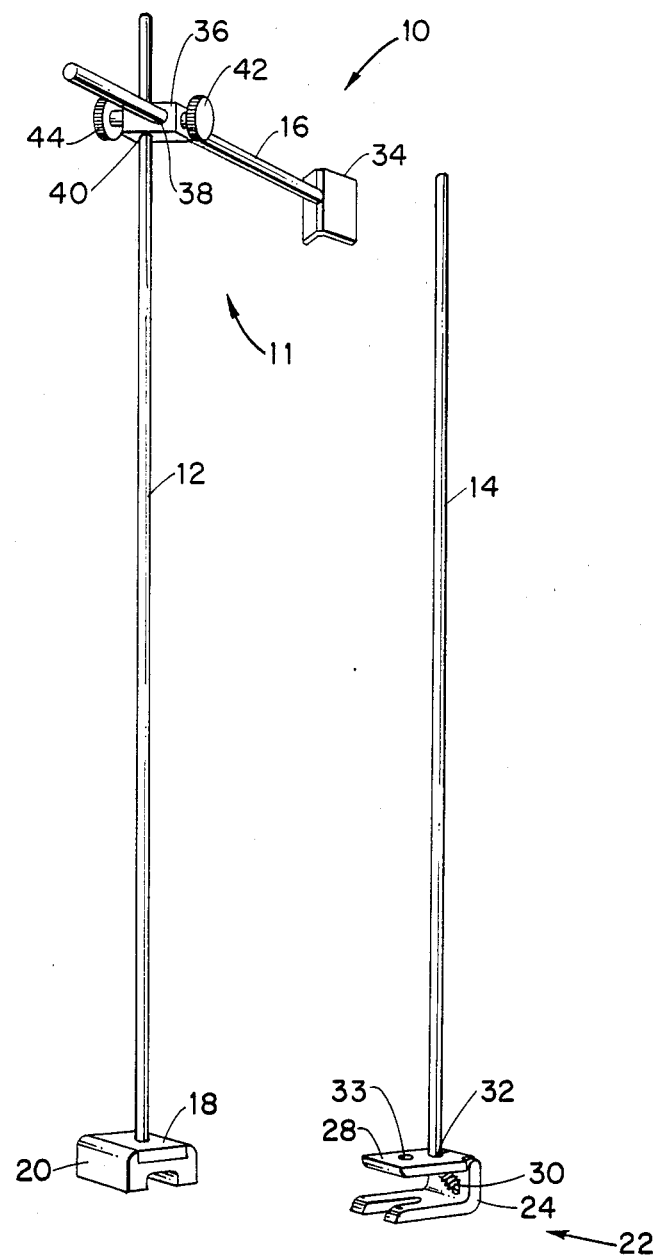
FIG. 1 is a pictorial view of the apparatus of the subject invention.

Referring now more particularly to FIG. 1, there is provided apparatus 10 including first rod 12, second rod 14 and third rod 16. Preferably, each rod is made of aluminum. Rod 12 is attached to plate 18 by means of a threaded hole in plate 18 and a threaded end of rod 12. None of the threading is shown, in that it is done by standard practice. Plate 18 is received in a slot in magnetic mounting base 20. Rod 14 is mounted to bracket 22. Mounting bracket 22 includes a clip portion 24 having a partially circular cut-out portion 26 for receiving the neck of a trailer ball. Bracket 22 also includes mounting plate 28, which is attached to clip 24 by means of a hinge. Spring 30 is connected between clip 24 and mounting plate 28. Rod 14 is mounted to mounting plate 28 through either hole 32 or hole 33 in a fashion substantially simiar to the rod 12 being mounted to plate 18.

Rod 16 has v-shaped guide member 34 connected to one of its ends. Rod 16 is mounted to rod 12 by means of mounting brackets 36. Mounting bracket 36 includes rod receiving hole 38 and rod receiving hole 40. Set screw 42 is adapted to come into contact with rod 16 so that the relative position of guide member 34 with respect to rod 12 is made adjustable. Set screw 44 comes into contact with rod 12 so that the height of rod 16 is also made adjustable. These set screws include large handles so that they are easily rotated. As can be seen, rod 16 is mounted at a right angle to rod 12, thus rod 16 is normally in a horizontal position.

Figure 2:
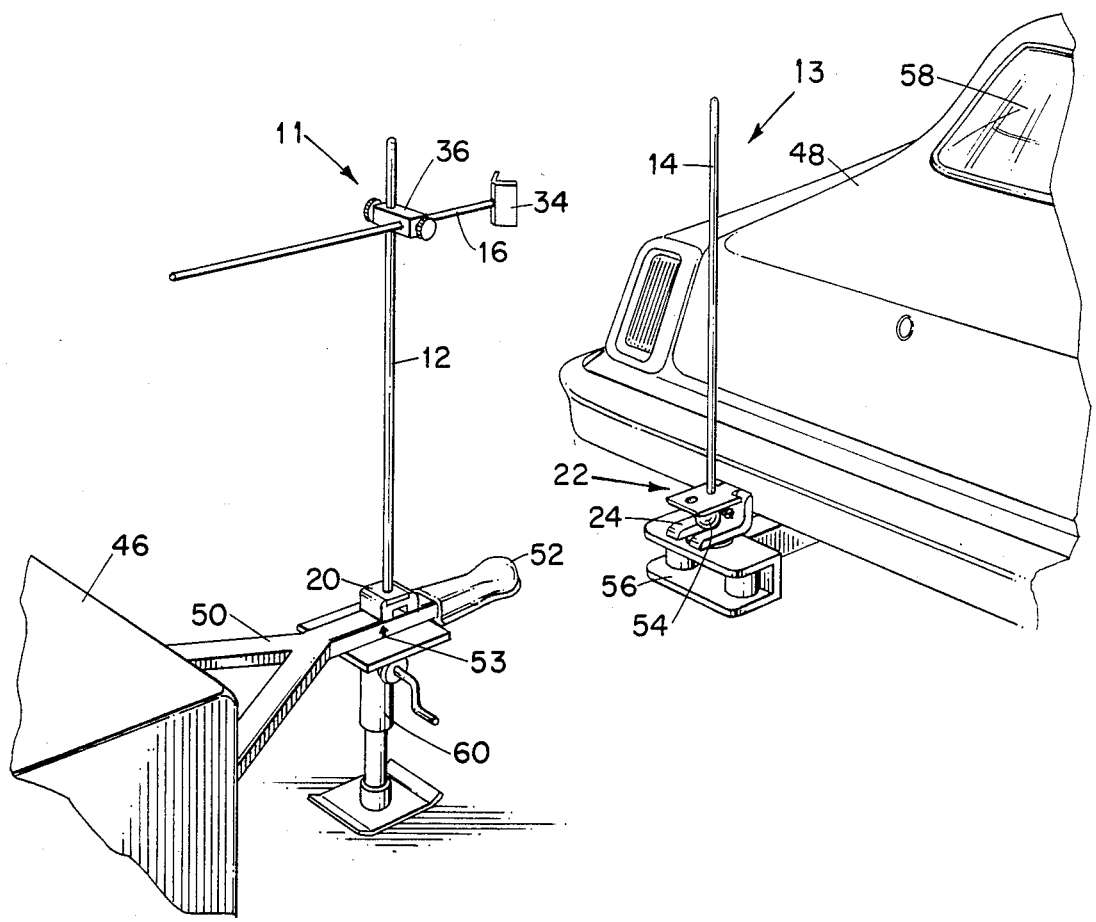
FIG. 2 is a pictorial view showing portions of a trailer and a motor vehicle having the apparatus of FIG. 1 attached thereto.

FIG. 2 shows the above described apparatus in position for use for hitching a trailer 46 to a motor vehicle 48. Only a portion of the trailer and motor vehicle are shown. The L-shaped rod assembly 11 is normally mounted to tongue 50 of trailer 46 a predetermined distance away from the end 52 of the tongue. If the ball receiving cavity of the tongue is not at or very near the end of the tongue, then the L-shaped assembly must be mounted a predetermined distance away from the ball receiving cavity.

Magnetic base 20 is attached to the tongue, and its position is normally marked by indicia 53 so that the apparatus may be used over and over again without the necessity of making the measurement from the end of the tongue 52 to the mounting place again. If the tongue 50 is not made of a material which attracts a magnet, then the L-shaped assembly 11 must be affixed to the tongue in some other manner, such as through a u-bolt bracket. The distance between guide member 34 and rod 12 is made approximately the distance between the end of trailer tongue 52 and indicia 53 or the place where the magnetic base 20 is mounted to the tongue. This is accomplished by moving rod 16 within bracket 36 until the two distances are equal. It is preferred that rod 16 itself be used to measure the distance between the tip of the tongue and indicia 53. A mark may also be made on rod 16, so that one will know exactly the place on rod 16 where it should be clamped by set screw 42. Alternatively, the distance between guide 34 and the place where rod 16 is mounted to rod 12 may be first predetermined, and the distance between tongue 52 and the place where rod 12 is mounted to the tongue is then measured by the use of rod 16.

Rod 14 is mounted to bracket 22 in the manner described in reference to FIG. 1. The clip portion 24 of the bracket is snugly received around the neck of ball 54 of trailer hitch 56. Trailer hitch 56 is mounted to motor vehicle 48. Bracket 22 may be readily slipped off and on the trailer ball. Rod 16 could also be mounted to rod 14 rather than rod 12, with the guide assembly 34 extending towards rod 12 so long as the distance between the guide and the rod on which it is mounted substantially equals the distance between the end of the tongue 52 and the place where rod 12 is mounted on the tongue.

However, preferably, rod 16 is mounted on rod 12 so that the guide 34 is clearly visible to the operater of the motor vehicle. At least the top portions of rods 12 and 14, as well as guide assembly 34, should be visible to the operator of the motor vehicle through back window 58 for proper operation of the apparatus.

Trailer 46 is hitched to motor vehicle 58 with the above described apparatus using the following procedure:

The tongue 50 of trailer 46 is elevated slightly above hitch 56 by means of a standard jack 60. The L-shaped rod assembly 11 is attached to trailer tongue a predetermined distance from the ball-receiving cavity of the tongue, which normally is at or near the end 52 of the tongue. That predetermined distance is measured by rod 16, and the distance between guide 34 and rod 12 is made equal to that above described predetermined distance by adjusting rod 16 through bracket 36. The I-shaped rod assembly 13 is mounted to trailer ball 54. As can be seen, the top of the trailer ball forms a stop for mounting plate 28 at a position where rod 14 will be vertical. Thus, the space between the upper surface of the lower portion of clip 24 and the lower surface of mounting plate 28 should be approximately the diameter of trailer ball 54.

The driver of the motor vehicle then begins backing the vehicle towards the trailer. The driver aligns rod 14 with guide 34, and just when the guide 34 and rod 14 contact one another, the end of tongue 52, which contains the ball receiving cavity, will be aligned directly over ball 54. If the driver backs slightly too far, rod 14 will not break because it will be permitted to incline off the vertical, in that plate 24 is hinged. Spring 30 will cause the plate to snap back into position after the strain is removed from rod 14. The I-shaped rod assembly 13 and the L-shaped rod assembly 11 are then both removed, respectively, from the ball and from the tongue. The tongue 50 is then lowered onto hitch 56 by means of jack 60, and the ball 54 is snugly received in the ball-receiving portion of hitch 50, thus the trailer is properly hitched.

Thus, it may be seen that utilizing the above apparatus and procedure, a single person may easily and quickly hitch a very heavy trailer to a motor vehicle without the requirement of a second person in the operation.

From the foregoing description of the preferred embodiment of the invention, it will be apparent that many modifications may be made without departing from the true spirit and scope of this invention.

I claim:

1. An apparatus for enabling a trailer, having a hitching tongue, to easily be hitched to a motor vehicle, having a trailer hitch with a ball mounted thereto, comprising:
   first, second and third rods;
   means for mounting said first rod onto the hitching tongue of the trailer;
   a bracket, having said second rod attached thereto, said bracket for mounting said second rod onto the motor vehicle near the ball of the trailer hitch;
   said bracket including a clip portion directly coupled to the ball of the trailer hitch, and a rod receiving portion pivotally mounted on said clip portion by a hinge;
   means for mounting said third rod on either said first or said second rod; said third rod projecting away from said rod on which said third rod is mounted;
   guide means connected to said third rod, said guide means adapted to come into contact with said rod which does not have third rod mounted thereto for insuring that the hitching tongue of the trailer is properly positioned near the ball of the trailer hitch for easily hitching the trailer to the motor vehicle a spring connected between said clip portion and said rod receiving portion for urging said rod receiving portion toward engagement with said ball and thereby permitting ease of mounting and removal of said bracket.

2. An apparatus as set forth in claim 1, wherein said means for mounting said first rod includes a magnetic base.

3. An apparatus as set forth in claim 1, wherein the hitching tongue has a free end, said first rod is mounted a predetermined distance from the free end of the hitching tongue of the trailer.

4. An apparatus as set forth in claim 3, wherein said third rod is mounted approximately perpendicular to the first and second rod upon which said third rod is mounted at a predetermined place, said third rod being substantially parallel to the hitching tongue.

5. An apparatus as set forth in claim 4, wherein the distance between said guide means and said first or second rod is approximately equal to said predetermined distance.

6. An apparatus as set forth in claim 4, further including means for adjusting the distance between the place on the third rod where said third rod is mounted to one of the other rods and said guide means.

7. An apparatus as set forth in claim 1, wherein said guide means is V-shaped.

8. An apparatus as set forth in claim 1, wherein said third rod is connected to said first rod.

9. A method for hitching a trailer, having a hitching tongue, to a motor vehicle, having a trailer hitch with a ball mounted thereto, comprising the steps of:

mounting a first rod on the hitching tongue of a trailer a predetermined distance from the ball receiving portion of the tongue of the trailer;

mounting a second rod on a motor vehicle near the ball of a trailer hitch utilizing a bracket having said second rod attached thereto;

said bracket including a clip portion directly coupled to the ball of the trailer hitch, a rod receiving portion mounted on said clip portion by a hinge, and a spring connected between said clip portion and said rod receiving portion for urging said rod receiving portion towards engagement with said ball and thereby permitting ease of mounting and removal of said bracket;

measuring said predetermined distance;

adjustably mounting a third rod having a guide connected to one end thereof to either said first or said second rod so that said third rod projects away from the rod on which said third rod is mounted at approximately a right angle;

adjusting said third rod so that the distance between said first or second rod where said third rod is mounted and said guide is approximately equal to the measured predetermined distance;

moving said motor vehicle toward said trailer until the rod which does not have the third rod mounted thereto comes into contact with or nearly comes into contact with said guide said rod receiving portion pivoting away from said ball against the urging of said spring to provide strain relief when said rod not having the third rod mounted thereto comes into contact with said guide;

removing said bracket from said ball of said trailer hitch;

placing said ball receiving portion of said hitching tongue onto said ball, whereby said trailer is hitched to said motor vehicle.

10. A method as set forth in claim 9, further including elevating the hitching tongue above the ball prior to moving the motor vehicle toward the trailer.

* * * * *